United States Patent [19]

Sheinbaum

[11] 4,120,158
[45] * Oct. 17, 1978

[54] POWER CONVERSION AND SYSTEMS FOR RECOVERING GEOTHERMAL HEAT

[76] Inventor: Itzhak Sheinbaum, 2038 E. Altadena Dr., Altadena, Calif. 91101

[*] Notice: The portion of the term of this patent subsequent to Nov. 2, 1993, has been disclaimed.

[21] Appl. No.: 741,646

[22] Filed: Nov. 15, 1976

[51] Int. Cl.² .................................................. F03G 7/00
[52] U.S. Cl. .......................................... 60/641; 60/660; 60/670
[58] Field of Search ................ 60/641, 651, 671, 670, 60/660

[56] References Cited

U.S. PATENT DOCUMENTS

| | | | |
|---|---|---|---|
| 2,927,428 | 3/1960 | Sala | 60/641 X |
| 3,282,048 | 11/1966 | Murphy | 60/651 X |
| 3,364,125 | 1/1968 | Switzek | 60/648 X |
| 3,379,248 | 4/1968 | Stange | 60/648 X |
| 3,845,627 | 11/1974 | Hutchinson | 165/45 X |
| 3,862,545 | 1/1975 | Ellis | 60/641 |
| 3,988,895 | 11/1976 | Sheinbaum | 60/641 |
| 4,044,830 | 8/1977 | Huisen | 60/641 X |

Primary Examiner—Allen M. Ostrager
Attorney, Agent, or Firm—Warren T. Jessup

[57] ABSTRACT

A process for the conversion of geothermal heat energy into electrical power by advantageously combining direct and indirect heat exchange systems and other systems to maximize the power production is presented herein. More specifically, a process and system is presented for the utilization of geothermal heat from flashed geothermal hot fluids composed of hot liquid and vapor. The heat from the hot liquid is advantageously exchanged with a working fluid in a direct contact heat exchanger, while the hot geothermal vapor is used in a boiler for heating, boiling and vaporizing the working fluid. The vaporized working fluid thus formed is fed into a power extraction device which may advantageously form a liquid mist upon expansion. The working fluid vapor is then condensed at the exhaust side of the power extraction device, and returned to the direct contact heat exchanger, thus closing the power cycle. The internal pressure inside the direct contact heat exchanger is carefully controlled to suppress boiling in the direct contact heat exchanger. The operating pressure of the boiler is also carefully controlled to fully evaporate the working fluid by condensing a portion or all the hot geothermal vapors. The direct contactor has a plurality of processing zones including a heat transfer zone, one or more separation zones for separating both liquids and solids, a precipitation zone, and a wash zone. In the heat exchanger zone and the precipitation zone, there is advantageously included precipitation trays vertically spaced for allowing salt precipitation without interfering with a secondary or the working fluid flow. The wash zone is advantageously equipped with a wash tray where the liquid secondary fluid can be scrubbed with water.

The process also provides for removal of non-condensable gases normally present in the geothermal fluid by converting some salt solution or brine electrochemically into an absorbing solution that can be used to absorb the non-condensables from the geothermal vapors.

16 Claims, 9 Drawing Figures

POWER CONVERSION AND SYSTEMS FOR RECOVERING GEOTHERMAL HEAT

BACKGROUND OF THE INVENTION

1. Field of the Invention

This invention relates to extraction of geothermal heat energy from the earth and more particularly to the extraction of power from the liquid and the vapor portions of the geothermal fluid, and systems for converting the heat carried by a working fluid into electrical power.

It is known that the interior of the earth is a molten mass of rocks and is very hot. This geothermal heat energy may advantageously and efficiently be employed as a primary source of energy for the generation of power by utilizing a geothermal fluid as a carrier. The fluid may be steam released from volcanic areas or hot water which is present in volcanic and in deep alluvial deposits that are porous enough to permit percolation of water to the deep hot zones. This water may have a temperature as high as 700° F. at a depth of 5,000 feet.

Additionally, the carrier fluid may be injected into the earth by means of a well where the carrier fluid is vaporized upon contact with the heat energy in the earth. This heat energy may be present in dry rock beds or in fluids, such as water, in the well.

2. Description of the Prior Art

In some areas the heat energy within the earth is carried to the surface by steam. This steam may be used directly in turbines to drive generators to generate electricity as the means of efficiently and effectively recovering the heat energy. Where there is a mixture of steam, non-condensables, such as carbon dioxide and hot water, the steam and non-condensables may be separated in a flash chamber and then used in a steam turbine. The fluid from a geothermal well may flow naturally to the surface or may have to be pumped to the surface.

An efficient way of utilizing hot fluid which may contain salts and other dissolved minerals, especially hot fluids from a geothermal well, is by passing a working fluid in heat exchange relationship through a surface exchanger with a working fluid. The working fluid has a boiling point that is below the input temperature of the hot fluid. This method and apparatus for utilizing the hot fluid as a primary source of energy represents an efficient way for generating power from hot fluids.

However, there are some hot fluids that contain such a high degree of salts and other dissolved minerals that the above method may not be efficiently and economically useful over a long period of time. For example, it is known that the water from some of the geothermal wells in the Imperial Valley in California have more than 400,000 parts per million of dissolved solids which include salts and other minerals. The passage of this brine through a surface heat exchanger can result in the deposit of silica or other types of scale therein with a substantial decrease in the heat transfer efficiency within the heat exchanger and an increase in the pressure drop through the exchanger.

A second way of utilizing the geothermal heat energy is by passing a high boiling point heat transfer fluid in direct heat transfer relation with the hot geothermal fluid. The heat transfer fluid is then cooled by vaporizing a working fluid which is allowed to expand and to produce power. This process requires two heat exchange operations, which may degrade the efficiency of the power conversion process and may increase the cost of the production of power.

A third way of utilizing the geothermal heat energy is by passing the geothermal fluid in direct heat transfer relationship with a working fluid, where the working fluid is allowed to boil and vaporize in the direct contact heat exchanger. The vaporized working fluid is expanded to produce power, condensed and returned to the direct contact heat exchanger. This process may be limited in flexibility and may not be suitable for the high temperature geothermal resources without process improvements.

SUMMARY OF THE INVENTION

To overcome the disadvantages of the other power conversion schemes and to otherwise increase the ability to remove heat energy from the earth, a power cycle is conceived in accordance with this invention where heat is removed from hot geothermal water and geothermal vapors by two distinct heat exchange modes and at preselected temperatures and pressures. This power cycle is especially suited for flashing hydrothermal resources, such as hot geothermal fluids, that may contain high amounts of dissolved solids and non-condensables.

A hot geothermal fluid containing water with solids dissolved therein and a vapor with non-condensable acid gases, such as carbon dioxide and hydrogen sulfide is produced by pressure reduction flashing of a geothermal fluid. The geothermal hot fluid is separated in a flash steam separation tank and the water portion delivered into a direct contact heat exchanger. Pumped working fluid is brought into heat exchange relationship directly with the hot geothermal water. The pressure in the direct contact heat exchanger is controlled so that the temperature of the working fluid exiting the direct contact heat exchanger is at or near the working fluid boiling point at that pressure with little or no vaporization of the working fluid. The geothermal water exchanges heat with the working fluid and upon cooling, may or may not precipitate some of the salts dissolved therein. This invention includes a special tray design to accept the precipitating salts without adversely affecting the internal flows in the direct contact heat exchanger.

It is know that large amounts of non-condensables containing corrosive gases, such as hydrogen sulfide and carbon dioxide, are produced simultaneously with the geothermal fluid. In accordance with the invention, a selective or a total removal of the corrosive gases can be accomplished by converting some salt solution or brine electrochemically into an absorbing solution that can then be used to absorb the non-condensables from the geothermal vapors.

The steam or vapor portion separated from the geothermal fluid passes through an acid gas removal section where a regenerative or non-regenerative process is used to absorb the acid gases or a portion of the acid gases from the non-condensables in the steam. Advantageously the acid gas removal process may include an electrolytic cell where some of the geothermal water is electrolytically treated to form a solution capable of absorbing some or all of the acid non-condensable gases in the steam. Thereafter, the steam is washed on a tray especially designed for the removal of particulate matter and dissolved materials entrained in the steam. The scrubbed steam is then fed to a heat exchanger where the steam condenses while boiling and vaporizing the working fluid. The vaporized working fluid, which may contain some steam, enters a power extraction device where, upon expansion of the vaporized working fluid, mechanical work or power is produced. The fluid exiting the power expansion device, which in accordance with this invention may advantageously contain a liquid mist, passes through a condenser where the working fluid which may contain some steam, water, and partially condensed working fluid, is totally condensed and pumped back into the direct contact heat exchanger, thus closing the power cycle.

The entire cycle is conceived for maximizing the power production from the available geothermal heat by carefully controlling the temperatures and pressures, in which the heat is exchanged.

The advantages and novel features of the invention will become apparent from the following detailed description when considered in conjunction with the accompanying drawings.

DETAILED DESCRIPTION OF THE PREFERRED EMBODIMENT

Figure 1:
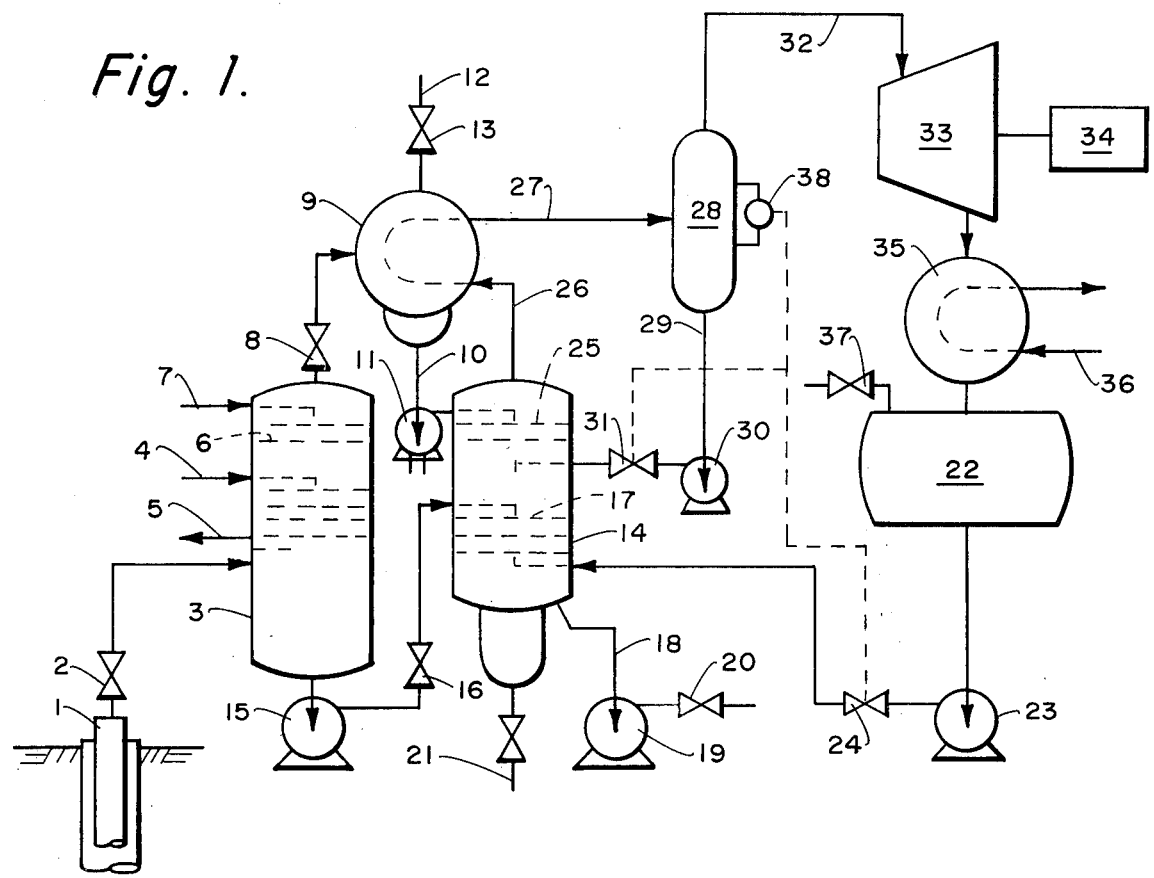
FIG. 1 is a flow diagram of a simplified version of the direct contact heat exchange cycle.

The preferred system for conversion of geothermal heat into electrical power is illustrated in FIG. 1 which depicts a simplified version of the direct contact cycle. Geothermal fluid from the geothermal well 1 flows through a back pressure controller 2 and into a flash steam separator 3. In the steam brine separator the steam is treated for the removal of all or a portion of the non-condensable acid gases. The non-condensables are removed in a special tray (see FIGS. 3 and 4) with a treating solution 4. The treating solution can be a regenerative type or a once-through type. If the acid gas removal system is a regenerative type, the rich solution 5 exits the steam brine separator 3 and returns to a regenerative unit (not shown). After the removal of acid gases, the steam is washed in the wash trays 6 (see FIGS. 3 and 4) with clean condensate 7. The clean steam enters the condenser 9, condenses by exchanging heat with the working fluid and a portion of the condensate 10 is pumped by the condensate pump 11 into the wash section of the direct contact heat exchanger 14.

The liquid portion of the geothermal fluid is pumped by the reinjection pump 15 through the controller 16 and into the direct contact heat exchanger 14. The direct contact heat exchanger is advantageously equipped with heat exchanger trays 17 (see FIG. 7). The exhausted geothermal liquid 18 is pumped by the booster pump 19 through the controller 20, back into the geothermal field through a suitable brine reinjection system (not shown.). Solids that may precipitate throughout the heat exchange operation in the direct contact heat exchange cycle 14 are removed continuously or intermittently for disposal through stream 21.

Secondary fluid or working fluid is pumped from the accumulator 22 by pump 23 through a flow controller 24 into the direct contact heat exchanger 14. In the direct contact heat exchanger, the working fluid extracts heat from the liquid portion of the geothermal fluid by the enhanced heat exchange action of the trays 17 and in a liquid form, enters the condensate wash trays 25. Entrained and dissolved minerals in the liquid working fluid are removed in the wash trays 25 and the clean working fluid 26 enters the steam condenser 9.

In the steam condenser 9 the working fluid vaporizes to form vapor with small amounts of entrained liquid droplets 27 and some vaporized steam and enters the working fluid knock-out drum 28. The entrained droplets in the working fluid are separated in the knock-out drum 28 and the liquid 29 is pumped by the working fluid recycle pump 30 through the controller 31 back into the direct contactor 14. The vapor 32 from the knock-out drum 28 is expanded in the expander 33 that may advantageously drive a power generator 34. The exhaust gases from the expander 33, which may advantageously contain entrained liquids, enter the condenser 35 to fully condense by exchanging heat with cooling water 36. The condensed working fluid is returned to the accumulator 22 and thus the cycle is complete. Non-condensables from the accumulator are removed through controller 37 for the recovery of carry-over working fluid.

To adjust the circulation rate of the working fluid to the production of geothermal fluid in the well 1, a liquid level controller 38 is mounted on the knock-out drum 28 to maintain a steady liquid level. The signal from the level controller 38 is fed into both controller 31 and controller 24. Controller 31 maintains a steady liquid level in the knock-out drum 28 and controller 24 maintains a steady circulation rate or working fluid. If the flow of geothermal heat is decreased, the amount of unvaporized working fluid liquid in the knock-out drum 28 increases, the liquid level controller 38 senses the change in circulation and resets the flow controller 24 to circulate less working fluid, and thus compensates the system for the decreased amount of heat input.

Figure 2:
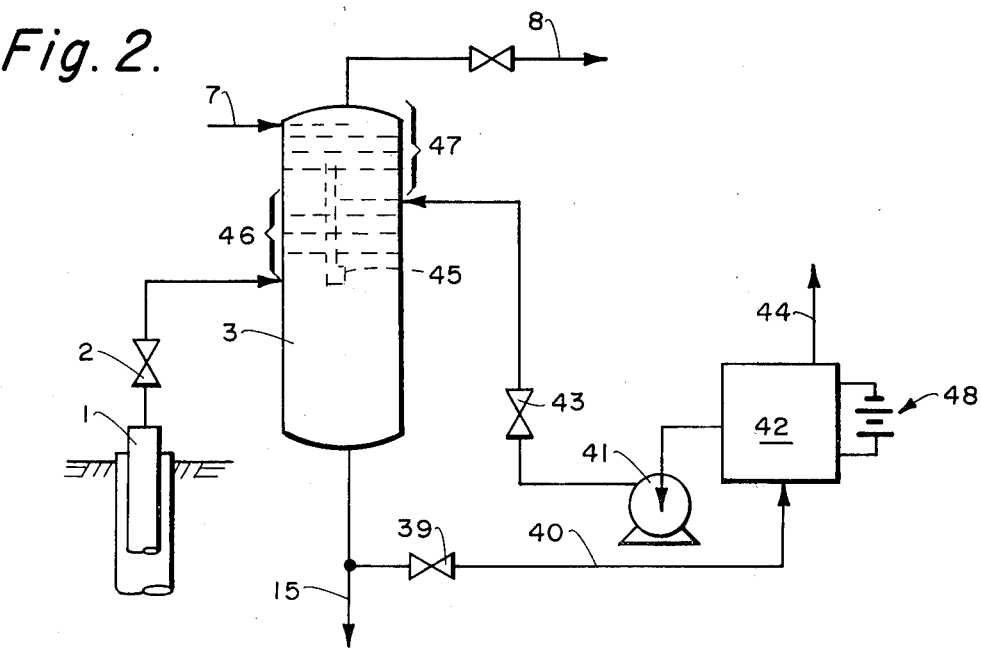
FIG. 2 is a flow diagram of a portion of FIG. 1 illustrating a preferred method of removing non-condensables from geothermal steam.

The partial system of FIG. 2 represents fragmentarily another form of the invention which may be considered a part of FIG. 1, describing one preferred method of absorbing the noncondensables from geothermal steam. Geothermal fluid that may contain liquid brine comes out of the geothermal well 1 through the back pressure controller 2 and into the steam separator 3. A portion of the geothermal fluid 40 is bled through the valves 39 into an electrolytic cell 42. Direct current is supplied to the cell from the battery 48 to convert some of the dissolved minerals in the geothermal brine into an absorbing solution for the noncondensables. Absorbing solution from the electrolytic cell is pumped through the absorption solution pump 41 through a controller 43 and into the absorption section of the steam separator 46. Steam, non-condensable gases, and vapors produced during the electrolytic reaction in the electrolytic cell 42 are removed from the system 44. Condensate 7 is used in the wash system 47 to wash the steam after it passes through the absorption section 46. The wash water from the wash section 47 may or may not dilute the absorbing solution and is discharged under the absorbing section 46 through the overflow cup 45. The scrubbed steam 8 is now ready to go into the condenser 10 9 (FIG. 1).

Figure 3:
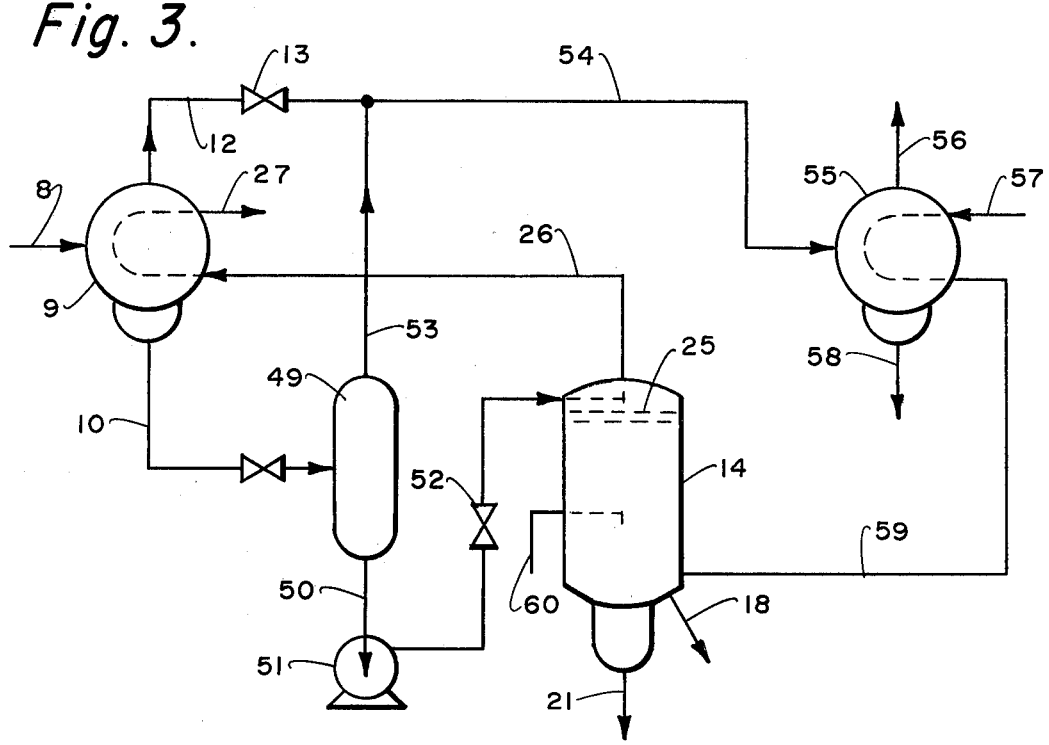
FIG. 3 is a flow diagram illustrating a modification to the system of FIG. 1 for processing a geothermal fluid containing a large amount of non-condensables.

FIG. 3 is another possible modification of FIG. 1, representing a system for the extraction of heat from geothermal fluid containing a large amount of non-condensables. It is desired to extract more heat from the steam contained in the non-condensables and at the same time to avoid contaminating the working fluid with dissolved non-condensables. Steam from the separator 3 (FIG. 1) that may contain non-condensables 8 enters the condenser 9 and exchanges heat with the working fluid. Steam condensate 10 is removed from the condenser 9 through a steam trap and/or a controller, and discharged into a steam flash drum 49. By a secondary flashing of the steam, essentially all of the dissolved non-condensables are removed from the condensate 10 in the vapor phase through stream 53. The non-condensables and the steam thus formed are combined with the vapor stream 12. The total flow of vapor is now composed of steam and non-condensables 54. In the non-condensable condenser 55 most of the steam is condensed 58 and the non-condensables are removed 56. A working fluid 57 from the working fluid circulation pump 23 in FIG. 1 is directed first into the non-condensable condenser 55 to absorb heat by cooling non-condensables, and from the condensation of steam. The warmed working fluid 59 enters the direct contact heat exchanger 14 and exchanges heat with the geothermal water 60 in the heat exchange zone 17 in FIG. 1. Hot flashed condensate from the steam flash drum 49 is pumped by the condensate pump 51 through the controller 52 and into the wash section 25 of the direct contact heat exchanger 14, clean working fluid 26 leaves the direct contact heat exchanger 14 and boils in the steam condenser 9 to form vapor 27 that may proceed into the knock-out drum 28 in FIG. 1. Separation of liquid and vapor such as the one performed in condensers 9 and 55 may be more advantageously done in a separate knock-out drum for ease of operation (not shown in FIGS. 1 or 3).

Figure 4:
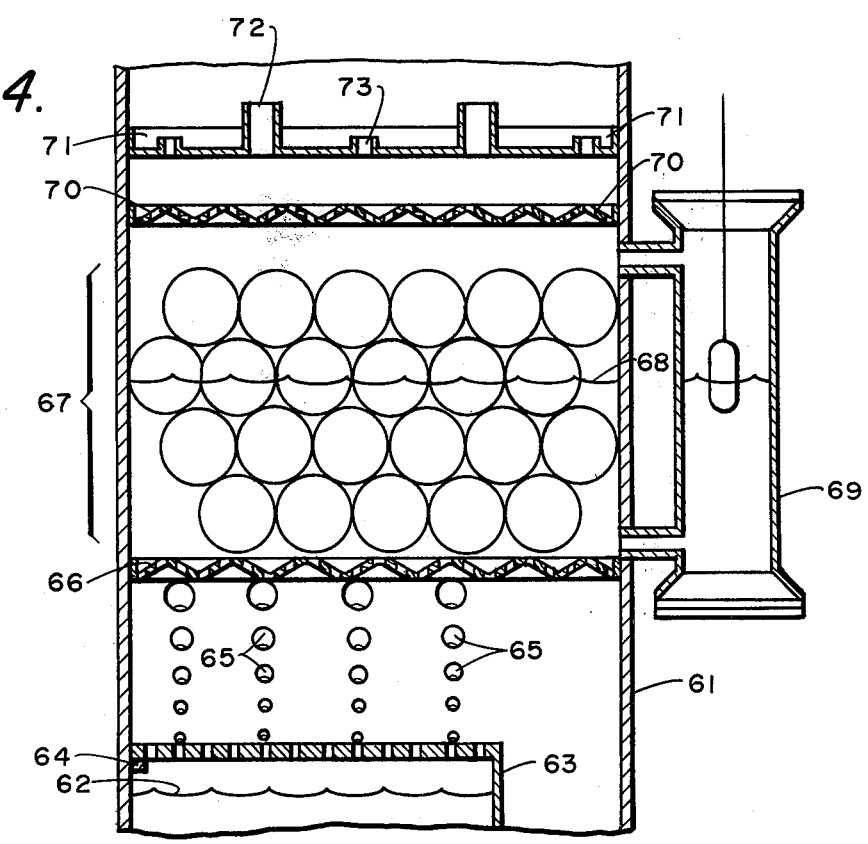
FIG. 4 is an illustration of one form of a boiling tray for the direct contact heat exchanger of FIG. 1 for boiling a secondary fluid.

FIG. 4 describes a direct contact heat exchanger boiling tray especially designed for boiling secondary fluid by direct contact with geothermal hot fluid when boiling is desired inside the direct contact heat exchanger. The boiling section in a direct contact heat exchanger 61 starts with the last tray 63 in the liquid-liquid heat exchange zone. The perforated tray as shown is supported by a ring 64 and contains underneath the tray in a separate liquid phase the working fluid 62. Liquid droplets escape through the perforation of the tray 63 and into the continuous phase above. Partial vaporization may occur at that point as indicated by the growing bubbles 65. Secondary fluid liquid or liquid-vapor bubbles enter a packed bed 67. The purpose of the packed bed is to provide nucleation sites for the boiling liquid and to continuously break and separate the boiling working fluid into liquid droplets and vapor bubbles. This section of the boiler can be packed with most available commercial packing material. Preferentially, the selection of the packing material for construction should be such that the packing is continuously wet by the working fluid. A packing support 66 is provided and a hold-down plate 70 added to prevent any loss of packing material. At the top of the packed bed, the evaporation is complete and the vapor-liquid phase line is shown at 68. Above the phase line the working fluid is being superheated by the geothermal fluid. In the superheat section the vapor is the continuous phase and the geothermal liquid is the dispersed phase. To distribute the geothermal liquid and for the proper irrigation of the packing, a distributor plate 71 is added. The vapor chimneys 72 in this plate allow the vapor to escape while liquid nozzles 73 are spaced and leveled for a uniform irrigation of the packing.

The phase line 68 level is maintained by a suitable external chamber level control 69. The level control would provide a feedback to an inlet valve to control the level of phase line 68.

Figure 5:
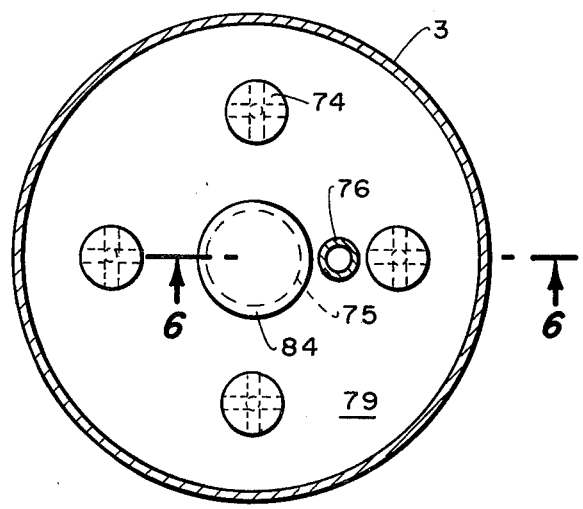
FIG. 5 is a top elevation of a wash tray for use in the system of FIG. 2.
Figure 6:
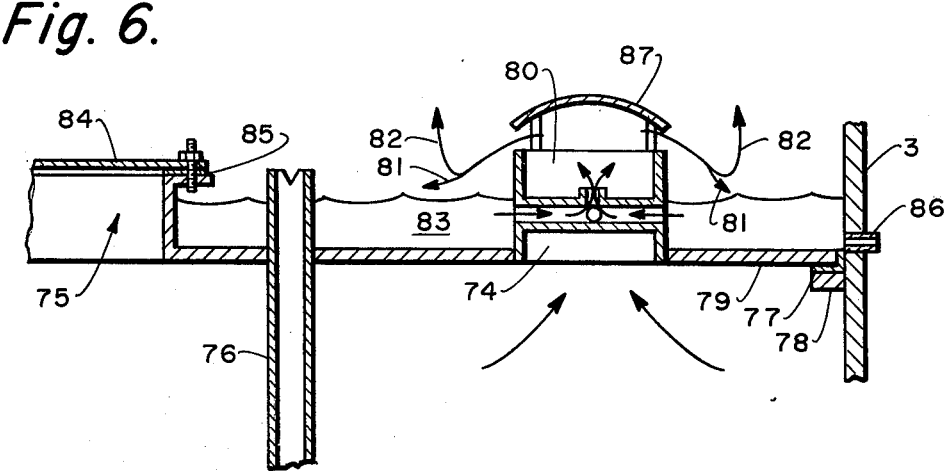
FIG. 6 is a side elevation of the wash tray of FIG. 5 in partial section taken at 6—6 of FIG. 5.

FIGS. 5 and 6 describe a wash and/or an atomizing treating tray 6. This tray can also be used for both sections 47 and 46 in FIG. 2. The tray has a plurality of atomizing elements 74, a manway 75, and a liquid downcomer and weir 76. The tray is shown again in FIG. 6 for more descriptive identification of its elements and its function. The wash section 6 of steam separator 3 can contain a single or a plurality of trays 79 or both the wash section and chemical treating section 46 and 47 in FIG. 2. The atomizing tray 79 is supported by the support ring 78 and sealed with a gasket 77 to eliminate any water leakage. Steam and noncondensables enter the orifice 74 of the atomizing elements and the increased vapor velocity through the orifice 80 atomizes the water. Gas and water droplets are diverted by the atomizing element cap 87 that may be dished, flat, or conical in shape, back in the direction of the tray. Because of the difference in gravity, the water droplets 81 return to the tray while the gas 82 is separated and ready to enter the next tray above. The downcomer pipe 76 with a weir notch is added to the tray to control the water level on the tray. Additionally, the tray 79 is equipped with a manhole 75 covered with a manhole cover 84 and sealed with a gasket 85 to prevent any vapor from bypassing the atomizing elements. For draining the tray, and/or inserting a pressure and/or temperature measuring device into the water on the tray, a nozzle 86 is provided in the wall of the steam separator. Water from the tray flows through the internal piping 83 of the atomizing elements horizontally or in an inclined position from four or more directions, and discharges into orifice 80 in the middle of the atomizing element. The water can be discharged upward or downward.

Figure 7:
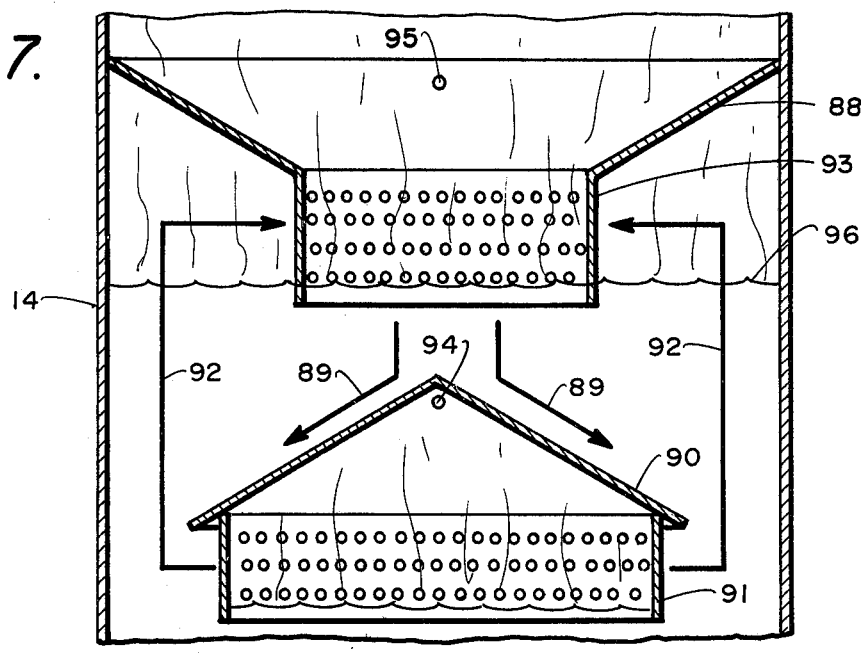
FIG. 7 illustrates a cone and funnel tray for a direct contact heat exchanger designed to precipitate geothermal fluid.

FIG. 7 describes a cone and funnel direct contact heat exchange tray especially designed for precipitating geothermal fluid. Upon cooling, geothermal liquid may precipitate salts and other minerals that may adhere to the surface of the internal elements of the direct contact heat exchanger, and thus plug the passages of the secondary or working fluid. Geothermal fluid from the top of FIG. 7 passes first through the funnel 88 and then through the inside parameter of the funnel skirt 93 in the direction of cone 90. The water then changes direction as indicated 89 and passes around the periphery of the cone section 90 and along the outside of the skirt of the cone 91. Working fluid in its movement upward by gravitational differences enters, as a dispersed phase, the inside of the skirt 91 of the cone 90. Inside the skirt of the cone, the dispersed phase coalesces into a continuous phase. By gravitational forces, the working fluid is dispersed again through perforations in the skirt of the cone 90, the droplets in the uplift movement 92 thoroughly mix with the geothermal fluid, extract its heat, and enter the coalesced zone 96. The coalesced liquid is again dispersed through the skirt of the funnel 93 and in droplet form proceeds upward. The skirt 91 of the cone 90, as well as the skirt 93 of the funnel 88, may or may not be recessed inward (as shown for the skirt of the cone) to reduce salt buildup on the walls of the skirt. For the purpose of draining the pockets in the cone and funnel, a weep hole 94 is provided for the cone and a weep hole 95 is provided for the funnel.

Figure 8:
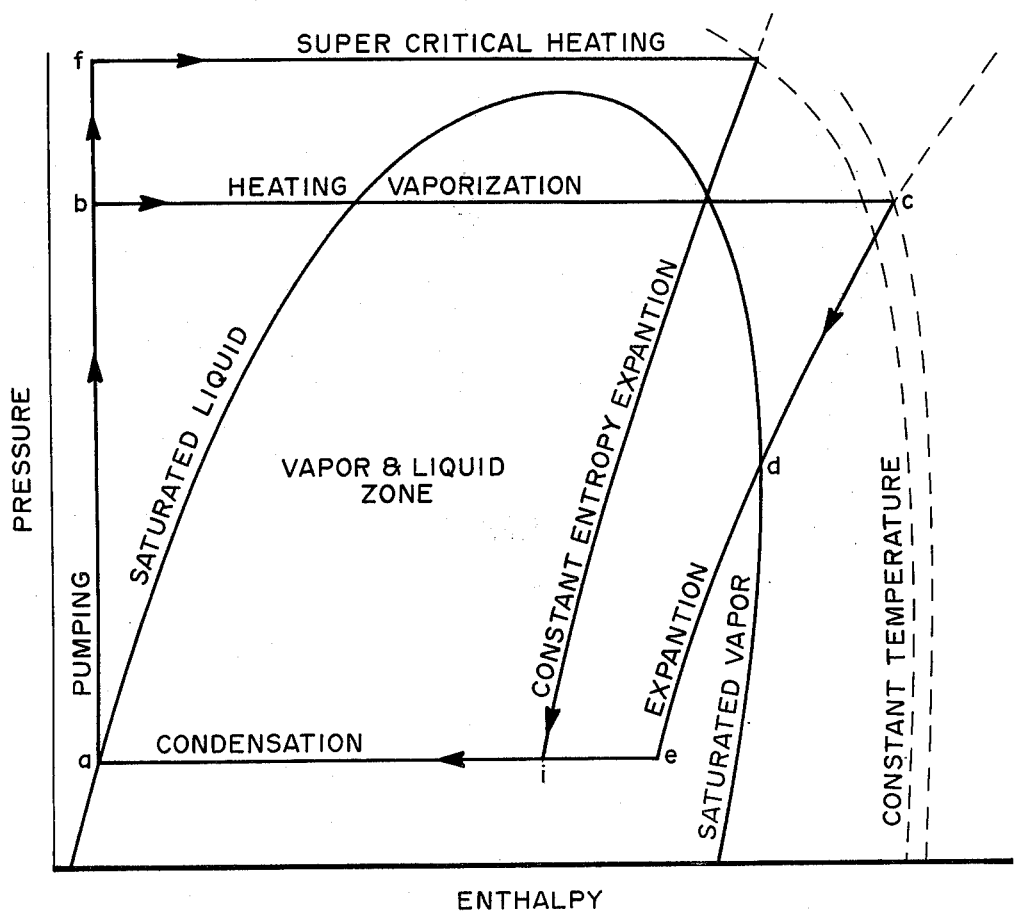
FIG. 8 is a pressure enthalpy thermodynamic chart for interpretation of partial condensation in the gas expander exhaust outlet.

FIG. 8 is a pressure enthalpy thermodynamic chart for a generalized component showing certain features of the power cycle, and in particular, the thermodynamic interpretation of partial condensation in the gas expander exhaust gases outlet. Condensed working fluid at point $a$ is pumped to point $b$ at essentially constant temperature. Between point $b$ and point $c$ the working fluid is heated, vaporized and superheated by the geothermal fluid. The vaporized, superheated working fluid now expands from point $c$ to point $d$ at a constant entropy. At point $d$ the expanding gases enter the two-phase vapor liquid zone, and as the working fluid proceeds with its expansion, liquid is formed all the way to point $e$. The amount of liquid formed at point $e$ is proportional to the ratio of the distance of point $e$ to the saturated vapor line to the distance between point $e$ and the saturated liquid line. Heat is removed in the heat rejection system of the cycle between point $e$ and point $a$ to totally condense the working fluid.

The second cycle shown is a super-critical cycle, where, in the case shown, a larger amount of condensation occurs upon expansion. The working fluid is pumped from point $a$ to point $f$ at essentially a constant temperature; between point $f$ and point $g$, heat is added to the working fluid; the working fluid expands between point $g$ and point $h$ along a constant entropy line. At point $h$, the two-zone vapor-liquid envelope is entered and thereafter liquid is produced upon additional expansion of the working fluid. The working fluid is fully expanded at point $i$ and thereafter heat is removed from the working fluid to cause condensation of the working fluid. For simplicity, expander efficiencies are not shown, nor is the temperature effect of pumping the fluid and the effects of non-condensables on the expansion. Similar thermodynamic charts can be used for the evaluation of multi-component working fluids where condensation of heavy components can occur upon expansion. One such case of partial condensation occurs when steam is combined with certain gaseous working fluids such as hydrocarbons and expanded in a gas expansion turbine.

Geothermal heat as well as the heat content of other waste fluids can be efficiently recovered and converted into mechanical energy in accordance with the system described herein.

In accordance with this invention, a new method is presented for an efficient yet economically attractive conversion of the potential heat in geothermal resources into electrical power. In addition, and as a part of the power conversion cycle, systems and means of improving the various components of the cycle are disclosed.

In the preferred system of FIG. 1, geothermal fluid flowing through the well 1 enters the separator 3 and separates into the gaseous portion of the fluid and the liquid portion of the fluid. The liquid portion of the fluid is taken out of the separating chamber and pumped to the proper operating pressure of the direct contact heat exchanger wherein heat is removed from the liquid geothermal fluid by a secondary working fluid. The removal of the heat is advantageously done with cone and funnel heat exchange trays as shown in FIG. 7, wherein enhanced heat exchange relationship occurs between the dispersed phase and the continuous phase, and at the same time, the precipitation of solids from the geothermal phase is accommodated without any interference with the heat exchange process. The solids thus formed are removed from the direct contact exchanger continuously or intermittently in the special device provided for it. The cold exhausted geothermal liquid is pumped back to the geothermal field for possible reinjection back into the producing horizons. Working fluid from the accumulator 22 is pumped into the lower portion of the direct contact heat exchanger 14. As shown in FIG. 7, the working fluid may form a separate liquid phase inside the internal elements of the direct contact heat exchanger. The working fluid is dispersed through the perforation of the cone and funnel tray and coalesces in a step-wise manner as it moves from a lower tray to a higher tray. This action of dispersing the working fluid through the perforation of the internal elements and coalescing on the tray above as shown in FIG. 7, enhances the transfer of heat between the geothermal fluid and the working fluid. As shown in FIG. 7, arrow 89, the high heat transfer is accomplished with a minimum amount of horizontal internal surfaces where precipitated solids can accumulate and plug up perforated sections. The dispersed phase proceeds by gravity upward into the cleaning section where hot condensate from the condensed gaseous portion of the geothermal fluid is used for washing down any entrained and dissolved minerals that may have been lifted out from the lower section of the direct contact heat exchanger. The dispersed phase can be either the geothermal water or the working fluid. If the working fluid is kept as the dispersed phase, perforated trays similar to the one shown in FIG. 4, item 63, can be used in the lower portion of this scrubbing zone. If any boiling is anticipated at the top of the scrubbing zone, a packed section, such as the one depicted in FIG. 4, item 67, can provide an efficient yet economic boiling area where the boiling liquid is provided with a large number of nucleation sites to enhance boiling and prevent any supersaturation. Conversely, if the washing condensate is used at the dispersed phase, condensate droplets will proceed through the packed section downward while the continuous working fluid phase will proceed upward. On the perforated tray below the packed section, as shown in FIG. 4, the dispersed water droplets will coalesce above the perforated tray to form a continuous phase in a chamber above the tray, and become redispersed into droplets as the condensate proceeds down through the perforation to the coalesced phase on the tray below. The packing material in FIG. 4 is selected so that both fluids flowing through that section can wet this material. If such a material is not commercially available, the minimum requirement is that the packing material be wet by the phase in which boiling occurs.

The scrubbed working fluid, essentially at its boiling point at the operating pressure and temperature, and possibly with a small amount of water, vaporized working fluid and steam, enters into a heat exchange relationship in the condenser 9 with the gaseous portion of the geothermal fluid. The vaporized working fluid 27 which at this point may contain liquid working fluid droplets, liquid water and steam, enters the separator 28. If, however, the vaporized working fluid stream 27 is advantageously superheated, it will not contain any entrained liquid. When liquid is separated in separator 28, the liquid is returned back through pump 30 and control valve 31 into the direct contact heat exchanger. The rate of accumulation of liquid in the separator 28 can be measured in the separator or in the flow rate of liquids in stream 31 and is used to modulate and control the working fluid circulation rate.

It is known that geothermal fluid as it is produced from the geothermal well does not come in a uniform continuous mode. At times, more steam and less water is produced; at times more non-condensables are produced; and at times reduced flow occurs. To balance the flow of heat from the geothermal resource to the working fluid, the circulation rate of the working fluid has to be modulated to accommodate these changes in total heat flow from the geothermal resource. In accordance with this invention, this modulation process is accomplished by a continuous recirculation of working fluid from the separator back into the direct contact heat exchanger. Accordingly, stream 27 will contain saturated working fluid vapor with 2% or 3% by weight of liquid. As more heat comes into the plant from the geothermal resource, the amount of liquid in stream 27 will diminish, the rate of accumulation of liquid in the separator 28 will decline, and thus the flow of working fluid returning to the direct contact heat exchanger through line 31 will decline. An automatic signal will then be sent to control valve 24 to increase the circulation of working fluid to the system to advantageously use the geothermal heat available. On the other hand, if the amount of heat supplied by the geothermal fluid declines, the proportional amount of liquid in stream 27 will increase the rate of accumulation of this liquid in the separator 28 will increase the rate of flow recirculating working fluid through stream 31 will increase and a signal will be sent to the main circulation controller 24 to reduce the amount of circulating working fluid.

The combined vapors from the separator 28 proceed through line 32 into the expander 33. The function of the expander is to convert the heat energy in the gases into mechanical energy. This can be done in many ways. One preferred method is the expansion of gas in an axial flow turbine similar to the type that is commonly used for the expansion of steam. Another preferred method is the expansion of the gas through the radial-inflow type expander especially designed for high efficiency and capable of maintaining as much as 20% weight liquid in its exhaust gas stream without efficiency losses. Radial-inflow expanders are extensively used in the natural gas industry where natural gas containing large amounts of heavier hydrocarbon components and water enters the expander; the gas is cooled and partially condensed upon expansion, and the collar mixed phase of liquid and vapor exits the exhaust side of the expander. In the case of natural gas expansion, a large amount of the heavier hydrocarbon and the steam in the feed gas to the expander condenses and thus natural gasoline and water is produced. Similarly, the radial-inflow expander can be used to expand multi-component working fluids that may contain steam and other gases. By properly selecting the working fluid composition, the amount of steam and other gases contained therein, the condensing pressure and temperature and the inlet pressure and temperature to the gas expander, the expanded gases can be caused to partially precipitate and condense at the outlet of the expander.

Because the expansion process is the conversion of heat energy to mechanical energy, when the expansion in the gas expander proceeds into the two-phase zone (see FIG. 8), the total heat removed from the gases upon expansion is the sum of the sensible heat of cooling the gases and the latent heat of condensing the portion that was liquified in the process. The addition of the latent heat of condensation to the total amount of heat converted into mechanical energy greatly improves the efficiency of the geothermal cycle. In addition, the size of the condenser and the amount of heat that has to be exchanged in the condenser 35 is now reduced because some of the effluent entering the condenser is already in a liquid state. Advantageously, expander 33 can be connected to a power generator whereby the mechanical energy produced in the expander is converted to electrical energy 34.

The gaseous portion of the geothermal fluid separated in the geothermal fluid separator 3 proceed to section 46 of FIG. 2 for the removal of non-condensables. Non-condensables can be removed or treated in the geothermal vapors in many ways. One way is to cause the geothermal gaseous portion to flow through a solid bed of catalysts and other reactive components to selectively remove the noxious portion of the non-condensables present in the gas. One such experiment is currently underway where the oxides of zinc are used for the adsorption of hydrogen sulfide from geothermal gases.

A second way of treating the gaseous geothermal fluid is by proportional injection of oxygen into the gaseous geothermal fluid for a direct oxidation of hydrogen sulfide to form elemental sulfur. In the preferred way described herein, the non-condensables are treated with a treating solution on a tray in the upper portion of the geothermal effluent separator as shown in FIG. 2. The treating solution can be manufactured in the treating plant as shown in FIG. 2 or it can be brought in in-part or in-whole from external sources. The treating solution, in addition, can be utilized once or can be taken out of the treating section, regenerated and returned for additional treating.

In one preferred way, the treating solution is formed by electrolytically treating some of the geothermal brine. The electrolytic process of salt solutions and brines is well known. Many of the brines contain a large amount of dissolved salts. Some of the more commons salts are: sodium chloride, potassium chloride, magnesium chloride, calcium chloride, lithium chloride, calcium carbonate, and others. By using the diaphragmed electrolytic cell, as commonly used for the production of caustic and chlorine gas, a high caustic solution can be formed on the cathode by the reaction of the metal ions with water, and chlorine and anions such as carbon dioxide can be formed on the anode. The chlorine gas thus formed can be sold as a byproduct or can be used, in part, for treating the water in the wet cooling tower. The caustic solution that was formed on the cathode can now be used for treating the geothermal gaseous fluid for the simultaneous removal of the hydrogen sulfide and the carbon dioxide. Both of the salts thus formed are soluble in the treating solution and will be retained therein. The exhausted treating solution can be added to the liquid portion of the geothermal effluent.

A second preferred way of producing the treating solution is utilization of an electrolytic cell without a diaphragm; thereby, metal ions and hypohalites ions are formed. The hypohalites ions are characterized by the addition of an oxygen element to the halogen element. A perchlorate treating solution can then be used to oxidize the hydrogen sulfide in the gaseous portion of the geothermal fluid. This will result in the formation of water and elemental sulfur as well as sulfur oxide gases. The elemental sulfur will stay in a colloidal or a coalesced form in the treating solution. The oxides of sulfur will remain in part dissolved in the treating solution and will be removed later in a wash section (47 in FIG. 2). The exhausted treating solution can then be added to the liquid portion of the geothermal fluid.

The use of other treating solutions, such as hot potassium carbonate solutions, arsenous and arsenic oxide solutions, conventional organic solutions and the like, is also possible. In any of the above treatment schemes, the process of eliminating a portion of the non-condensables from the gaseous portion of the geothermal fluid depends on good vapor-liquid contact. Vapor-liquid contact can be achieved in many ways. It can be achieved on valve trays such as in distillation; it can be achieved in sieve trays, grids, baffle trays and others. One preferred way of obtaining vapor-liquid contact is by the use of the atomizing tray 79 illustrated in FIGS. 5 and 6. In this tray, high velocity vapor enters the atomizing nozzles 74, atomizes the liquid that gets to the center of the atomizing nozzle through the liquid passages 83 and carries the atomized liquid with it through the outlet at the top of the atomizing nozzles. The cap 87 on top of the atomizing nozzle deflects the flow 82 and the entrained droplets 81 separate out of the gas and return to the bulk liquid on the tray. Thus, the gas proceeds upward to the next tray above and the treating liquid overflows into the downcomer 85 to the tray below.

An example of the treating process is presented herein:

Example No. 1

It is known that the geothermal steam at the Geysers Field in California contains the following approximate level of noncondensables:

| Component | Lb/100lb stm. | Mole/100lb stm. |
|---|---|---|
| $CO_2$ | .79 | .01795 |
| $H_2S$ | .05 | .00147 |
| $NH_3$ | .07 | .00412 |
| Other | .09 | — |
| | 1.00 | |

The non-condensables are treated to:
a. Remove all the $CO_2$ as $NaHCO_3$    $NaOH + CO_2 \rightarrow NaHCO_3$
b. Remove all the $H_2S$ as NaHS    $NaOH - H_2S \rightarrow NaHS + H_2O$
c. Use all the $NH_3$ as $NH_4OH$    $NH_3 + H_2O \rightarrow NH_4OH$
Required caustic with 20% wt. .01836 mols/100lb stm.
excess or .735 Lbs/100lb stm.

The required electrical power to generate this caustic solution in an electrolytic cell is about 0.8KWH/100lb stm. Byproduct $Cl_2$ produced is about 0.65 lb/100lb stm.

By removing the non-condensables, the steam condensing pressure is lowered to improve power production. Without most of the non-condensables, the condensing pressure can be reduced from 4.5 in. Mg to 3.0 in. Hg. With a back pressure of 4.5 in. Hg, 3.7 KWH/100lb stm. is produced. 4.1 KWH/100lb stm. can be produced if the non-condensables are removed and the back pressure is reduced to 3.0 in. Hg. However, 0.8KWH/100lb stm. is required in the electrolytic manufacturing the treating solution needed for the removal of the non-condensables. Therefore, the removal of the non-condensables will require about 11% of the total power produced at the 4.5 in. Hg back pressure level.

Example No. 2

If only the $H_2S$ is to be removed by oxidation with a metal hypohalogen, then a typical reaction will be: $NaClO + H_2S \rightarrow NaCl + H_2O + S$. For the non-condensable composition shown in Example 1, the amount of NaClO required to oxidize the $H_2S$ with 20% excess is 0.13 lb/100lb stm. The required power needed to produce the NaClO in an electrolytic cell is about 0.06 KWH/100lb stm., or about 1.6% of the total power produced by the steam. It is recognized that other components of the non-condensable gases may also be oxidized by the hypohalogen ion. This example is simplified for illustrating the invention.

The gaseous portion of the geothermal fluid after being treated in the treating section (46 in FIG. 2), proceeds into the cleaning section 47. In the cleaning section, entrained salts, minerals and soluble gases are removed from the gaseous geothermal fluid. In the cleaning section, the geothermal gases are washed with clean water or condensate. This washing action is advantageously performed in an atomizing tray described above and shown in FIGS. 5 and 6. The wash water can then be added to the cleaning solution in the tray below or by-passed and added directly to the geothermal liquid underneath as shown in FIG. 2.

The clean and treated geothermal gaseous effluent in FIG. 2 (8) can now be used in many ways. It can be utilized to drive a power generating steam expansion turbine for the production of electrical power directly. It can be used to boil secondary fluid in heat exchange relationship for the production of power by the expansion of the vaporized secondary fluid in a power extraction gas expansion device coupled to a power generating apparatus, or it can be used for vaporizing preheated working fluid as shown in FIG. 1. In the preferred way, the treated clean geothermal effluent, enters heat exchanger 9 in FIG. 1; the steam condenses while vaporizing the working fluid; and the condensate thus formed is used for washing and heating the secondary fluid by direct contact as discussed above.

The complete removal of the non-condensable gases from the gaseous geothermal effluent may not be economically feasible in some cases. FIG. 3 describes the preferred way of providing the heat exchange relationship between a working fluid and the gaseous portion of the geothermal fluid when this gaseous geothermal fluid contains non-condensables. Gaseous geothermal fluids enter into a heat exchange relationship with a working fluid in heat exchanger 9; the condensate 10 from this heat exchanger is flashed in separator 49 for the removal of dissolved non-condensables in the condensate. Thereafter, the condensate is used for washing the working fluid as described above. The non-condensables and the steam exit the heat exchanger 12 and are combined with the non-condensables from the condensate flashing process and brought into heat exchange relationship with cold working fluid in exchanger 55. At this point, most of the steam condenses out of the non-condensable stream and the non-condensables are removed and disposed of. By condensing the geothermal effluent gases with both preheated and cold working fluid, a greater proportion of the heat in the geothermal gaseous effluent is recovered and at the same time a large portion of the steam is removed from the noncondensables and thus the disposal of the non-condensables becomes less of an economic burden.

Another preferred way of operating the power cycle as described herein is when the hot geothermal fluid is brought to the surface by mechanical means. In this alternate, hot fluid that may contain non-condensable gases, dissolved solids, minerals, and other particulate matter enter the separator 3. The flashing pressure in separator 3 is determined in a pressure controller valve 13 or valve 8 so as to maximize the amount of power that can be produced in the expander 33. This is done by properly selecting the working fluid and by properly selecting the operating pressure and the temperature at which this working fluid will vaporize in the exchanger 9. The temperature maintained in the geothermal effluent separator 3, in any event, has to be higher than the vaporizing temperature of the working fluid in the exchanger 9. However, the pressure in the geothermal fluid separator will in most cases be lower than the pressure in the direct contact heat exchanger. In general, it can be stated that the higher the geothermal fluid temperature, the more efficient will be the geothermal cycle. To maintain a high geothermal temperature in this alternate cycle, it will be required that a minimum amount of steam is flashed in the geothermal steam separator 6 to maintain the high temperature level. To properly transfer this heat to a secondary fluid, this will require that the secondary fluid absorbs most of its heat in the direct contact exchanger as sensible heat and a smaller proportion of the geothermal heat is used in vaporizing the working fluid. These conditions are achieved by operating the secondary fluid near or at its critical conditions, where most of the heat is absorbed as sensible heat and where only a small portion of heat is required for the latent heat of vaporization. By properly controlling the flashing temperature and pressure of the geothermal fluid and by selection of the proper working fluid as a singly pure fluid or a multi-component fluid, the power cycle can be optimized for each geothermal resource and the operating conditions of the power cycle can be determined.

Example No. 3 is added herein to illustrate the alternate cycle.

Example No. 3

Geothermal hot water containing 5,000 ppm of dissolved solids and a negligible amount of non-condensables is pumped into the geothermal steam separator at 360° F. and 140 psig. What working fluid can be used for the conversion of the available geothermal heat into power? At what pressure and temperature should the geothermal steam be flashed to produce the most net power in the conversion cycle?

This requires and iterative solution. One iteration will be illustrated and the rationale for the proceeding iterations will be discussed.

Select isobutane as the working fluid with an expander inlet pressure of 400 psia and vaporize the working fluid without superheating. The cycle conditions are plotted in FIG. 9. Isobutane is heated between point $a$ and point $b$ by direct contact heat exchange with the geothermal water. The boiling point is reached at point $c$, where the isobutane boils by condensing the geothermal steam. The gaseous isobutane expands between point $d$ and $e$ (shown in FIG. 9 at 82% expansion efficiency). The superheat is removed in the condenser between points $e$ and $f$ and the isobutane condenses between point $f$ and point $a$. The condenser duty is shown between point $j$ and point $k$. 10° F. approach were used in the condenser. 10° F. approach were used in the direct contact heat exchanger. 20° F. approach were used in the vaporizer.

Figure 9:
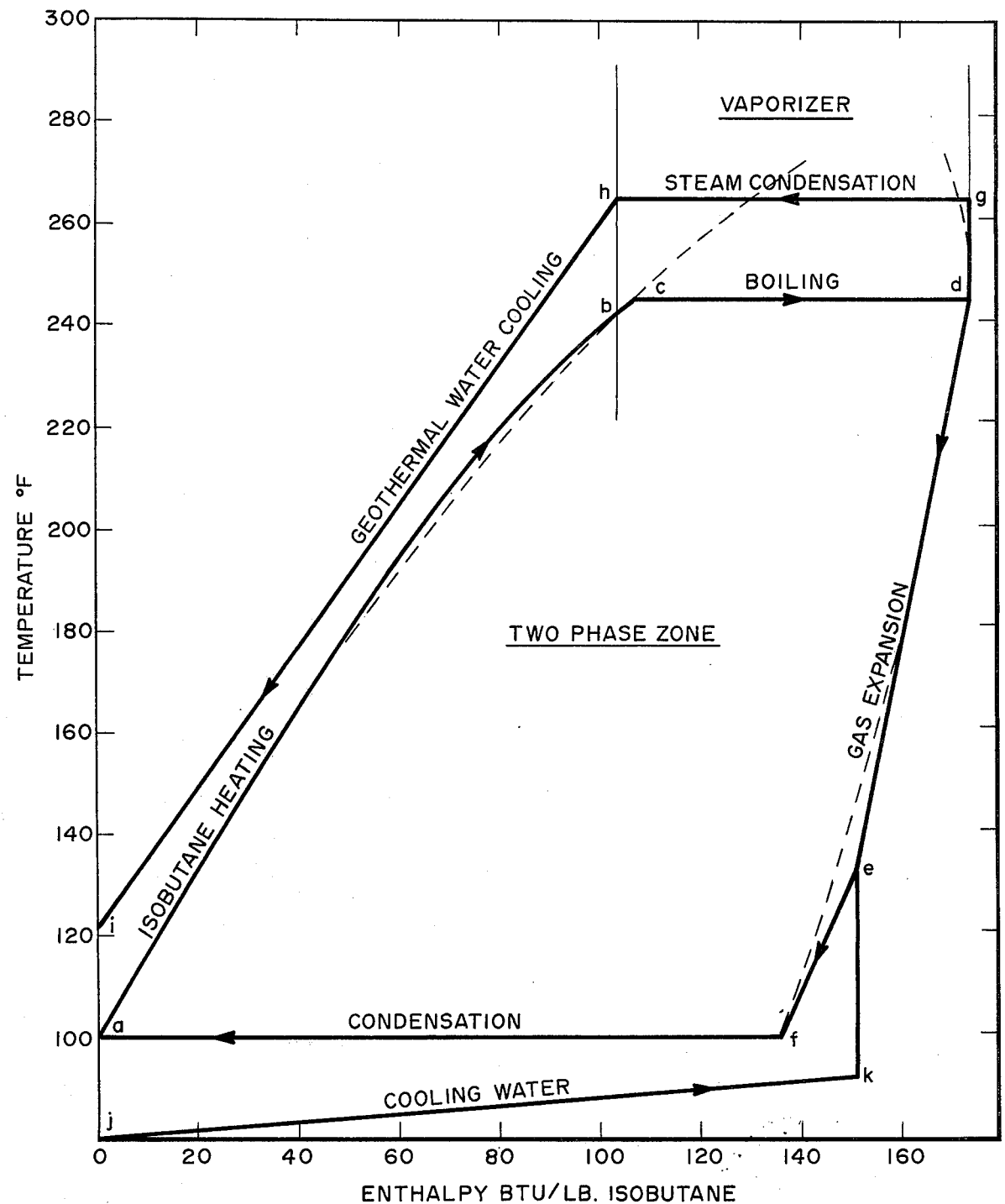
FIG. 9 is a graph illustrating treatment of a geothermal fluid according to the invention.

The results are presented in FIG. 9 as follows:

| 1. | Flashing pressure of brine | 137.9psia |
|---|---|---|
| 2. | Working fluid circulation rate | .72lb isobutane lb water |

| Approximate Plant Evaluation for $10^6$Lb/hr Geothermal Water Feed Rate | | |
|---|---|---|
| 1. | Working fluid circulation | 720,000lb/hr |
| 2. | Gross power with 82% expander efficiency | 5,900KWH |
| 3. | Heat rejection duty | 109 × $10^6$BTU/hr |
| 4. | Power for the internal circulation of isobutane | 500KWH |

In the next iteration, the initial assumptions are varied to see if the net power produced can be improved upon. The next iteration will include changing the working fluid used, or changing the operating pressure of the working fluid, or other properties as the case may be.

Other examples of cycle productivity, overall efficiency, the cost of some of the components of the cycles, and the installed cost of typical cycles processing one million pounds per hour of high temperature brines is available in the literature. The inventor presented two papers publicly where some of the basic novelties of this invention are described. The references are as follows:

1. "Power Production from High Temperature Geothermal Waters", I. Sheinbaum. Published in the *Proceedings of 11th Intersociety Energy Conversion* Engineering Conference, Sept. 12–17, 1976.

2. "Power Production from High Salinity Geothermal Waters", I. Sheinbaum. Published in the *Los Angeles, Council of Engineers and Scientists Proceedings*, Series Vol. 2, 1976.

3. "Power Production from High Salinity Geothermal Waters", I. Sheinbaum. Published in *Geothermal Energy*, Vol. IV, No. 3, March, 1976.

Various changes may be made in the details of the process without departing from the spirit and scope of the invention as defined by the appendant claims.

What is claimed is:

1. The process of recovering heat from geothermal fluid which may contain salt, non-condensables and dissolved minerals comprising the steps of:
   separating the liquid geothermal fluid from the gaseous geothermal fluid;
   heating a working fluid in a first heat exchange relationship by direct contact heat exchange with the separated geothermal liquid;
   transforming at least a portion of the working fluid to a gaseous state by further heating the preheated working fluid in a second heat exchange relationship with the separated gaseous portion of the geothermal fluid; and
   expanding the gaseous working fluid in a power extraction gas expansion device.

2. The process in accordance with claim 1 including the further steps of:

cleaning the working fluid before transforming said working fluid to a gaseous state, condensing the working fluid after power extraction and circulating the working fluid in a closed loop, and recovering any working fluid dissolved or entrained in the geothermal fluid.

3. The process in accordance with claim 1 including the further steps of:

controlling the separation pressure and temperature of the geothermal liquid and geothermal gaseous fluid, treating the gaseous geothermal fluid for the removal of the noncondensables carried therein, and cleaning the gaseous geothermal fluid to remove minerals and other entrained particles before entering into a heat exchange relationship with the working fluid.

4. The process in accordance with claim 1 including the further step of:

selecting a working fluid which will partially condense upon expansion, and controlling the pressure and temperature at the inlet of the expansion device to enhance said condensation.

5. The process in accordance with claim 1 wherein, the working fluid has a specific gravity below that of the geothermal fluid, and said working fluid being substantially insoluble in the geothermal fluid.

6. The process in accordance with claim 1 including, enhancing the heat transfer relationship in the direct contact heat exchanger by the addition of internal elements to the heat transfer apparatus, said internal elements including passages therein to allow for salt precipitation in the direct contact heat exchanger without affecting substantially the heat exchange rate between the working fluid and the geothermal liquid.

7. A process in accordance with claim 1 including the further step of:

removing salts, precipitating minerals and particulate matter from the direct contact heat exchanger intermittently or continuously.

8. The process in accordance with claim 1 including enhancing the heat exchange relationship in the direct contact heat exchanger by, producing a dispersed phase of the geothermal liquid in one or more sections of the direct contact heat exchanger and producing a continuous phase of the geothermal liquid in one or more other sections of the direct contact heat exchanger.

9. The process in accordance with claim 1 including enhancing the recovery of power from the gaseous working fluid by controlling the operating pressure and temperature of the gaseous working fluid to be at or near the critical pressure and temperature conditions of the working fluid.

10. A process in accordance with claim 1 including the further steps of:

controlling the rate of circulation of working fluid to the heat exchange means relative to the available geothermal heat by partially vaporizing the working fluid during the heat exchange relationship;

separating the liquid portion of the working fluid from the gaseous portion of the working fluid;

recirculating the separated liquid portion of the working fluid in a closed loop;

sensing the flow rate of the recirculated liquid portion of the working fluid;

controlling the flow of the working fluid entering the first exchange relationship by a signal received from the sening of the recirculation rate of the separated working fluid.

11. A power generating system wherein a working fluid is heated and vaporized by a hot geothermal fluid and circulated in a closed loop comprising:

separating means for separating the hot fluid into a liquid portion and a gaseous portion;

wash means for washing the gaseous portion of the hot fluid for removing non-condensables, minerals, and particles therefrom;

direct contact heat exchange means for heating the working fluid by direct contact with the liquid portion of the hot fluid;

wash means for washing the heated working fluid after direct contact with the liquid portion of the hot fluid for removing entrained minerals from the working fluid;

heat exchange means for exchanging heat between the gaseous portion of the hot fluid and the preheated working fluid to vaporize at least a portion of the working fluid;

gas expansion means for expanding the vaporized working fluid;

power generating means connected to the expansion means for converting the energy from the expansion of the vaporized working fluid into electrical power;

condensing means for receiving and condensing the working fluid from the gas expansion means; and pumping means for circulating the condensed working fluid in a closed loop.

12. The power generation system according to claim 11 including:

control means for controlling the rate of circulation of the working fluid pumped by said pumping means by partially vaporizing the working fluid in the heat exhange means;

separating means for separating the liquid portion of the working fluid from the gaseous portion of the working fluid;

recirculation means for recirculating the separated liquid working fluid from said separator to the circulation loop;

sensing means for sensing the rate of recirculation of said separated liquid working fluid; and said control means receiving a signal from said sensing means for controlling the rate of circulation of said working fluid by said pumping means.

13. A system for generating power by a working fluid heated with a hot geothermal fluid and circulated in a closed loop comprising:

vaporizing means for partially vaporizing the working fluid by heating it to its saturation temperature;

separating means for receiving the partially vaporized working fluid and separating the liquid portion from the gaseous portion;

expansion means for receiving and expanding the gaseous portion of the working fluid to produce mechanical energy;

condensing means for receiving and condensing the working fluid received from the expansion means;

pump means for returning the liquid portion of the working fluid from said condensing means and said separating means to the circulation loop; and sensing control means connected to said separating means for sensing and controlling the liquid level in said separating means by controlling the circulation rate of liquid working fluid from said pumping means.

14. The system for generating power according to claim 13 wherein said pump means for flowing liquid working fluid in said circulation comprises:

a separate pump connected respectively to said separator and said condensing means; and pump control means connected to each pump for controlling the rate of flow of liquid working fluid from said separator and said condenser.

15. The system for generating power according to claim 14 including:

connecting means for connecting said sensing control means to said pump control means for controlling the rate of flow of working fluid from said condensing means according to the rate of flow of liquid working fluid sensed coming from said separator.

16. A process of converting heat from a hot geothermal fluid into power comprising the steps of:

separating the gaseous portion of the hot fluid from the liquid portion of the hot fluid, passing the liquid portion of the hot fluid in a direct contact heat exchange relationship with a working fluid;

vaporizing the working fluid by a heat exchange relationship with the gaseous portion of the hot fluid;

expanding the vaporized working fluid in a gas expansion device for the recovery of power thereof, partially condensing the working fluid at the outlet of the gas expansion device and, recirculating the working fluid in the closed loop.

* * * * *